United States Patent [19]

Reifenberger et al.

[11] Patent Number: 4,745,901

[45] Date of Patent: May 24, 1988

[54] CONTROL METHOD FOR PROTECTING AN IC ENGINE DURING EXTENDED HEAVY LOADING

[75] Inventors: Mark G. Reifenberger, Grosse Pointe Park; David C. Poirier, Troy; Michael A. Davis, Pontiac; Harold M. Martin, Southfield; Gary J. Brand, Novi, all of Mich.

[73] Assignee: General Motors Corporation, Detroit, Mich.

[21] Appl. No.: 17,769

[22] Filed: Feb. 24, 1987

[51] Int. Cl.⁴ .......................... F02P 5/15; F02D 41/10
[52] U.S. Cl. ..................................... 123/416; 123/422; 123/492
[58] Field of Search ............... 123/416, 417, 425, 435, 123/478, 492

[56] References Cited

U.S. PATENT DOCUMENTS

| | | | |
|---|---|---|---|
| 4,245,602 | 1/1981 | Omori et al. | 123/416 X |
| 4,467,764 | 8/1984 | Takasu et al. | 123/416 |
| 4,640,249 | 2/1987 | Kawamura et al. | 123/422 X |
| 4,697,563 | 10/1987 | Becker et al. | 123/422 X |

Primary Examiner—Tony M. Argenbright
Attorney, Agent, or Firm—Mark A. Navarre

[57] ABSTRACT

An engine control normally effective for regulating the fuel and spark timing to provide substantially optimum engine performance. Periods of heavy operator loading are identified and integrated over time to define engine operating conditions for which engine protection concerns predominate. At such time, the normal controls are overriden to operate the engine at a reduced performance level, thereby to protect the engine from preignition damage.

6 Claims, 5 Drawing Sheets

CONTROL METHOD FOR PROTECTING AN IC ENGINE DURING EXTENDED HEAVY LOADING

This invention relates to automotive internal combustion (IC) engine control, and more particularly to a control method for protecting the engine from preignition damage during extended heavy loading.

In state-of-the-art control of a spark ignition engine, the spark timing and fuel delivery can be scheduled in a generally standardized fashion to nearly optimize the engine performance. The ignition timing, for example, may be scheduled as close as possible (within the control tolerance) to a setting referred to as the Minimum Best Torque (MBT) spark advance. The MBT spark advance is empirically determined as a function of various engine operating parameters, assuming that a specified octane rating fuel is being used, and represents the amount of spark advance which provides the best engine output torque. Fuel delivery is scheduled in relation to the air ingested by the engine, and is adjusted during conditions of changing operator demand.

However, during periods of heavy engine loading, engine knock and preignition can occur if the optimum performance spark timing and fuel scheduling is maintained. This is especially true if the operator uses fuel having an octane rating lower than the specified octane rating. If the knock persists for an extended period, or preignition develops, engine damage may result.

The control is further complicated in applications where the engine intake manifold has been tuned to provide increased performance. Typically, there is an engine speed range (tuning range) over which the tuned performance increase occurs, and the likelihood of engine knock and/or preignition in such range is greatly increased.

This invention is directed to an engine spark timing and fuel control, especially for tuned intake engines, effective during periods of extended heavy engine loading for protecting the engine from preignition damage while providing a reasonable measure of optimum engine performance. In normal operation, under both heavy and average engine loading, the spark timing is maintained at the MBT spark advance setting, within control tolerances. The possibility of preignition damage due to operation in the tuning range during such normal control is avoided by increasing the normal fuel delivery to enrich the air/fuel mixture.

As a measure of the potential for engine damage, the heavy engine load periods are identified and integrated over time. When the integrated time exceeds a reference time, the spark timing is retarded from the MBT setting at a controlled rate to a safe, engine speed related value to protect the engine from preignition damage. In such case, increased tuning range fuel is no longer needed; if present, it is removed as the spark is retarded. When the cumulative time spent in the tuning range is relatively long, the fuel may be further reduced to prevent dilution of the engine oil.

The above control avoids overall degradation of engine performance in the name of engine protection. Until the integrated time at heavy load exceeds the reference time, performance concerns predominate. In such case, the fuel enrichment permits the spark timing to be maintained at the MBT setting in the tuning range for maximum performance. Typically, the time at MBT is sufficiently long to permit the engine to accelerate the vehicle well beyond normal operating speeds. Once the integrated time at heavy load exceeds the reference time, engine protection concerns predominate. In such case, the spark timing is retarded for engine protection, and the increased tuning range fuel, if any, is removed. The spark and fuel controls are scheduled so that even if the operator is using a relatively low octane rating fuel, only light knock will occur prior to the spark retard, and no preignition engine damage will result.

Figure 1:
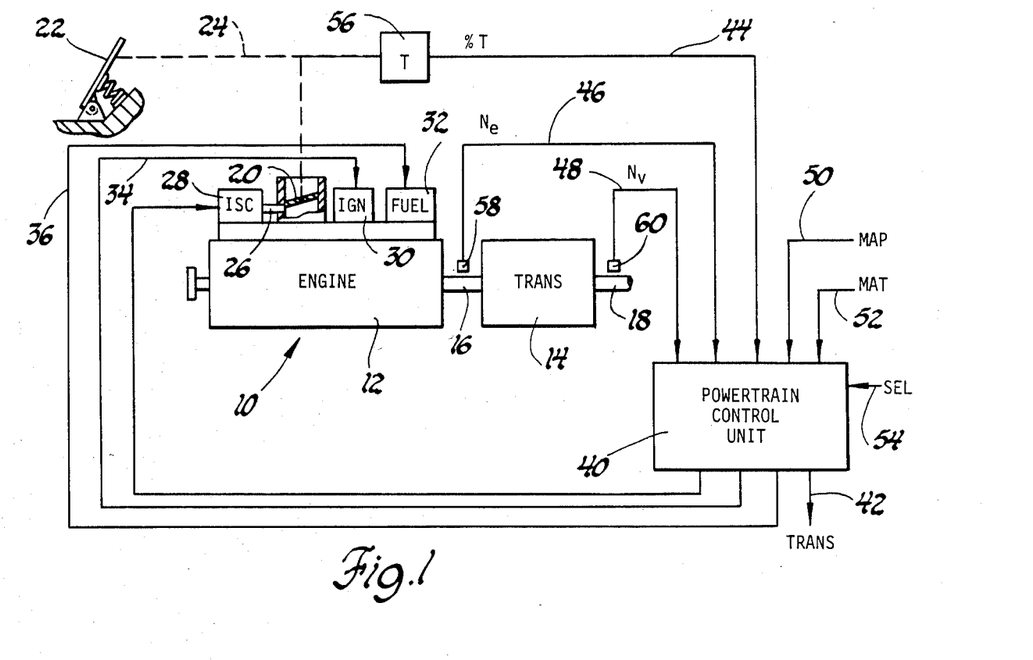
FIG. 1 is a schematic diagram of a motor vehicle drivetrain and engine control system including a computer-based control unit for carrying out the control functions of this invention.

Referring now to the drawings, and more particularly to FIG. 1, reference numeral 10 generally designates a motor vehicle drivetrain including an engine 12 and an automatic transmission 14. The engine output shaft 16 drives the transmission 14, and the transmission output shaft 18 drives the vehicle wheels (not shown).

The engine power output for driving the vehicle and other accessory loads (not shown) is adjusted primarily by the operator of the vehicle who positions an engine throttle 20 via an accelerator pedal 22 and a suitable linkage 24. Increasing (opening) the throttle setting effects an engine power output increase; decreasing (closing) the throttle setting effects an engine power output reduction. When the operator releases the accelerator pedal 22, a throttle return spring (not shown) closes the throttle 20 until it engages the armature 26 of an idle speed control motor (ISC) 28.

The engine 12 also includes conventional ignition and fuel control systems 30 and 32. The ignition control system 30 receives a desired spark timing signal via line 34 and generates electrical discharges in the various engine cylinders for initiating combustion therein in accordance with the timing signal. The fuel control system 32 injects fuel into the engine 12 in accordance with the fuel pulse width information on line 36.

As explained hereinafter, the ISC motor 28, the ignition control system 30 and the fuel control system 32, are each controlled by a powertrain control unit (PCU), generally designated by the reference numeral 40. The operation of the transmission 14 may also be controlled as indicated by the line 42. In performing such control, input signals indicative of various operating parameters are supplied to the PCU 40 via lines 44–54. The engine throttle position signal on line 44 is obtained via a position transducer 56 responsive to the accelerator pedal linkage 24. The engine and vehicle speed signals $N_e$ and $N_v$ on lines 44 and 48 are obtained with conventional speed pickups 58 and 60. The remaining input signals on lines 50–54 pertain to the engine manifold absolute pressure (MAP) 50, the engine manifold air temperature (MAT) 52, and the position (SEL) of an operator-manipulated transmission shift selector (not shown), and are obtained using conventional transducer technology.

Figure 2:
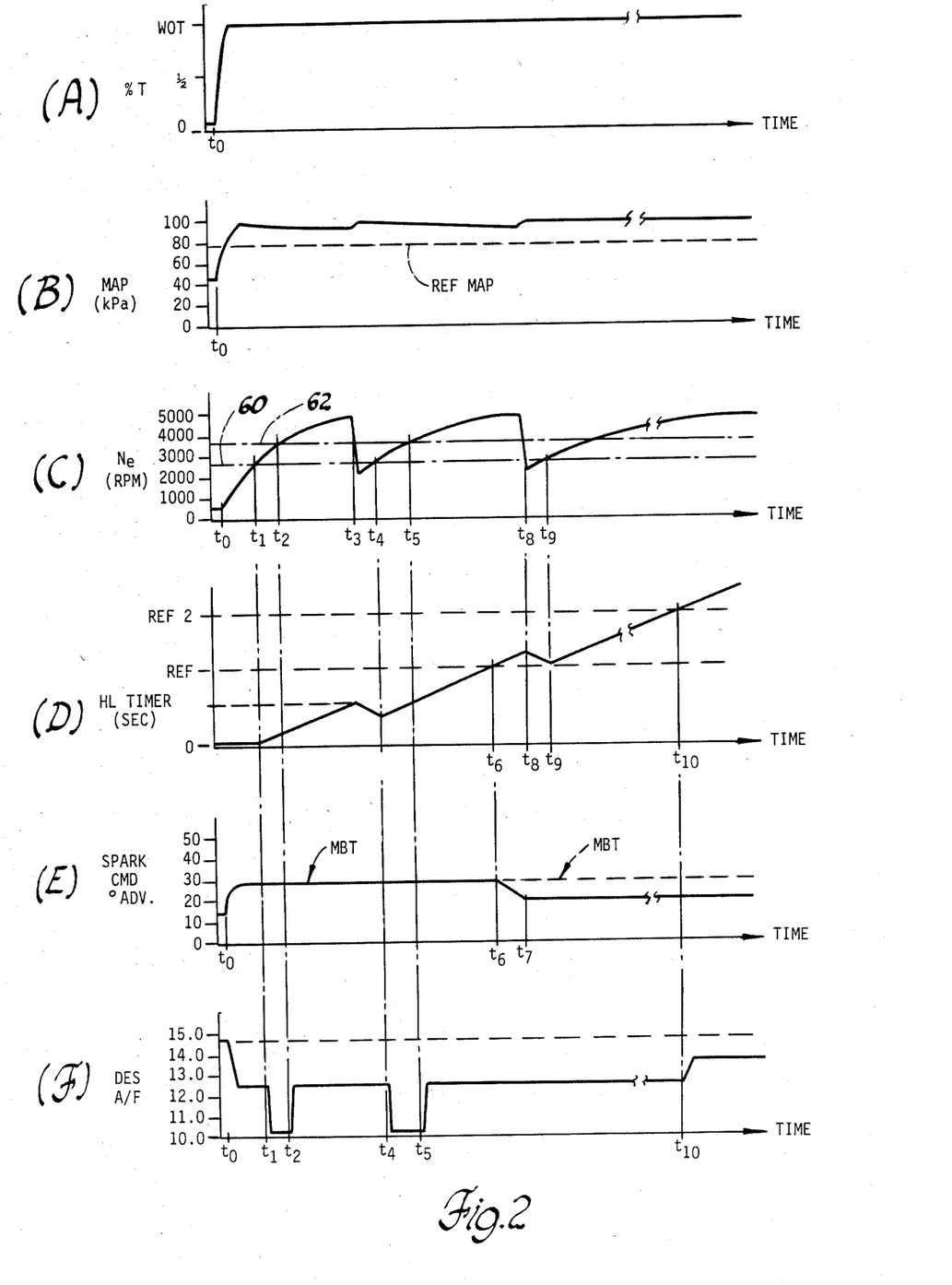
FIGS. 2A–F and A–C are graphs depicting the operation of this invention in a period of heavy engine loading.

Graphs A–F of FIG. 2 depict the operation of the fuel and spark control of this invention during a period of wide-open throttle vehicle acceleration. Graph A depicts the position of the engine throttle 20 and therefore represents the operator demand; Graph B depicts the measured intake manifold absolute pressure (MAP) of the engine 12; Graph C depicts the engine speed $N_e$; Graph D depicts the count in a heavy loading timer (HL TIMER); Graph E depicts the spark timing command according to this invention; and Graph F depicts the desired air/fuel ratio (A/F) according to this invention. Each of the Graphs A–F are depicted on a common time base.

The intake manifold of engine 12 is tuned to produce increased engine power output over a tuning range as defined by the broken lines 60 and 62 in Graph C. As also seen in Graph C, the engine speed $N_e$ passes through the tuning range several times in the course of the vehicle acceleration as the transmission 14 is shifted from its lowest gear ratio to its highest gear ratio. Corresponding ripples also occur in the manifold absolute pressure (MAP) as seen in Graph B.

According to this invention, heavy engine loading is indicated whenever the manifold absolute pressure and the engine speed $N_e$ exceed respective threshold values. The engine speed threshold is defined by the lower limit of the tuning range. The heavy loading timer (HL TIMER) integrates the periods of heavy loading over time; that is, the count in HL TIMER increases whenever the heavy loading criteria are met and decreases whenever the heavy loading criteria are not met. In the example illustrated in FIG. 2, the minimum MAP criteria REFMAP is continuously met while the engine speed criteria is intermittently met due to the transmission shifting.

At time $t_0$ in the Graphs A–F, the accelerator pedal setting is increased from near zero to a wide-open throttle (WOT) setting. This causes a corresponding increase in the MAP and the PCU 40 increases the spark timing advance as indicated in Graph E to maintain the MBT setting. In addition, the fuel control portion of the PCU 40 enters a first power enrichment mode in which the air/fuel ratio (A/F) is decreased for engine performance. Such control is largely conventional, as will be recognized by the those skilled in the art of engine control.

However, at time $t_1$, the engine speed enters the tuning range defined by the broken line 60. After a momentary delay, the PCU 40 enters a second power enrichment mode in which the air/fuel mixture is further enriched to permit the spark timing to be maintained at the MBT setting without incurring significant knocking and/or preignition. In addition, the heavy loading timer (HL TIMER) begins integrating upward at a predetermined rate. The fuel enrichment is continued until time $t_2$ when the engine speed is increased above the tuning range as defined by the broken line 62. After a momentary delay, the PCU 40 returns to the first power enrichment mode, as seen in Graph F.

At time $t_3$, a transmission shift occurs and the engine speed falls through the tuning range, as indicated in Graph C. The time in the tuning range is shorter than the momentary delay imposed by PCU 40, and the second power enrichment mode is not engaged. When the engine speed falls below the tuning range, as designated by the broken line 60, the period of heavy engine loading is over and the HL TIMER integrates down from the value it had attained.

At time $t_4$, the engine speed re-enters the tuning range as defined by the broken line 60. This causes the HL TIMER to begin integrating upward, as indicated in Graph D, and additionally causes the PCU 40 to enrich the air/fuel mixture, as described above.

At time $t_5$, the engine speed leaves tuning range defined by the broken line 62 and the PCU 40 removes the enrichment, as indicated in Graph F. Meanwhile, the HL TIMER continues to integrate upward until at time $t_6$ it exceeds a reference time REF, as indicated in Graph D. At such time, the spark timing command is retarded at a progressive rate from the MBT setting as indicated in Graph E.

At time $t_7$, the spark timing command is fully retarded to an engine speed dependent value empirically determined for avoiding engine damage due to preignition. Had the engine speed been in the tuning range at time $t_6$, the increased fuel would no longer be needed and the first power enrichment mode would be reengaged. Thereafter, the PCU 40 is no longer required to over-enrich the air/fuel mixture even though the engine speed is in the tuning range, as in the interval $t_8$–$t_9$.

The HL TIMER continues to integrate up and down in accordance with the identified periods of heavy demand, as described above in reference to Graph D, until the count therein exceeds a second reference REF 2. At this point, there may be engine oil dilution concerns, and the PCU 40 increases the air/fuel ratio to a somewhat higher value, as indicated in Graph F at 1 time $t_{10}$ to prevent dilution of the engine oil.

Figure 3:
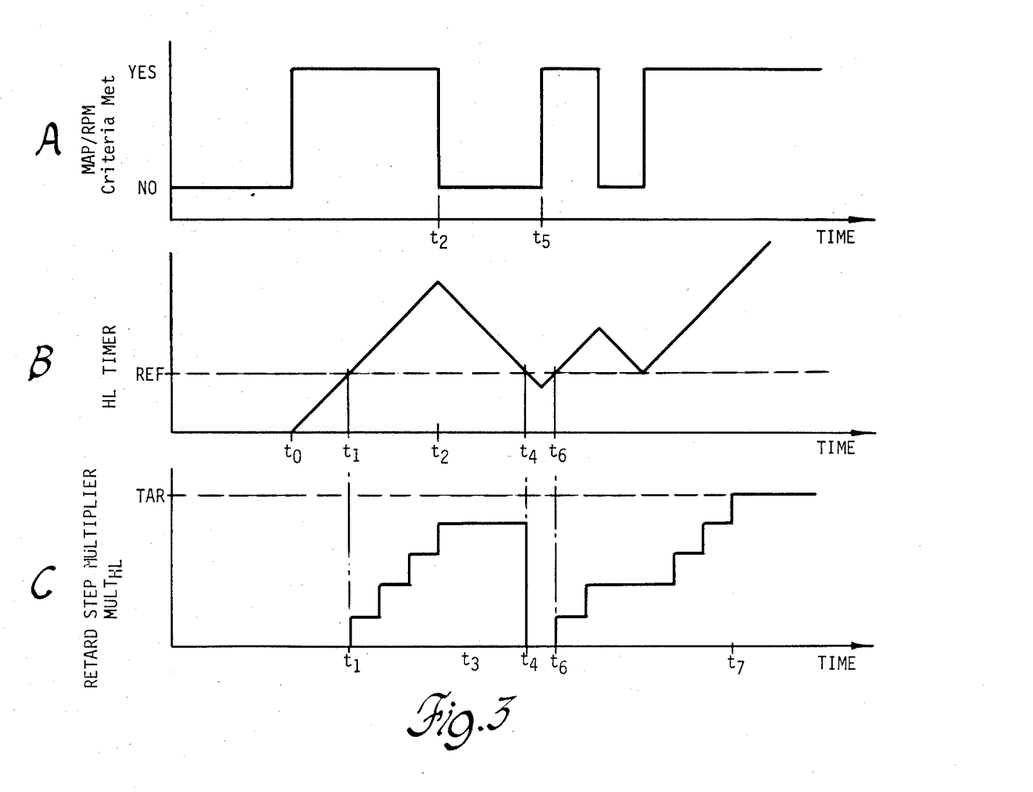

The Graphs A–C of FIG. 3 depict the operation of the HL TIMER for a period of operation in which the heavy engine loading criteria are intermittently met. Graph A indicates whether the MAP and engine speed criteria have been met (yes or no); Graph B depicts the count in the HL TIMER as in Graph D of FIG. 2; and Graph C depicts a retard step multiplier used in the scheduled retard of the spark timing. As in FIG. 2, the Graphs A–C are depicted on a common time base.

As described in reference to Graph D of FIG. 2, the HL TIMER depicted in Graph B of FIG. 3 integrates upward so long as the heavy engine loading criteria are met and integrates downward when the criteria are not met. Thus, the HL TIMER integrates upward beginning at time $t_0$. When the HL TIMER count exceeds the reference time REF at time $t_1$, the retard step multiplier for spark retard is incremented, as indicated in Graph C to begin a progressive retard of the spark timing.

As will be described below in reference to the flow diagrams of FIGS. 4–6, the spark timing is retarded in a progressive manner by defining the step size (STEP) and the delay (RAMP DELAY) between steps. At time $t_2$, the heavy loading criteria are no longer met and the count in the HL TIMER begins integrating downward. The retard step multiplier (and hence, the amount of spark retard) is frozen at its current level until the heavy loading criteria are met again or the HL TIMER falls below the reference REF. When the count in the HL TIMER falls below the reference time REF at time $t_4$, the retard step multiplier is reset to zero, as indicated in Graph C, to return the spark timing to the MBT setting.

The operation described above is repeated when the heavy loading criteria are met again at time $t_5$, and the count in the HL TIMER exceeds the reference REF at time $t_6$. In this case, however, the timing is eventually retarded (at time $t_7$) to the target value TAR.

Figure 4:
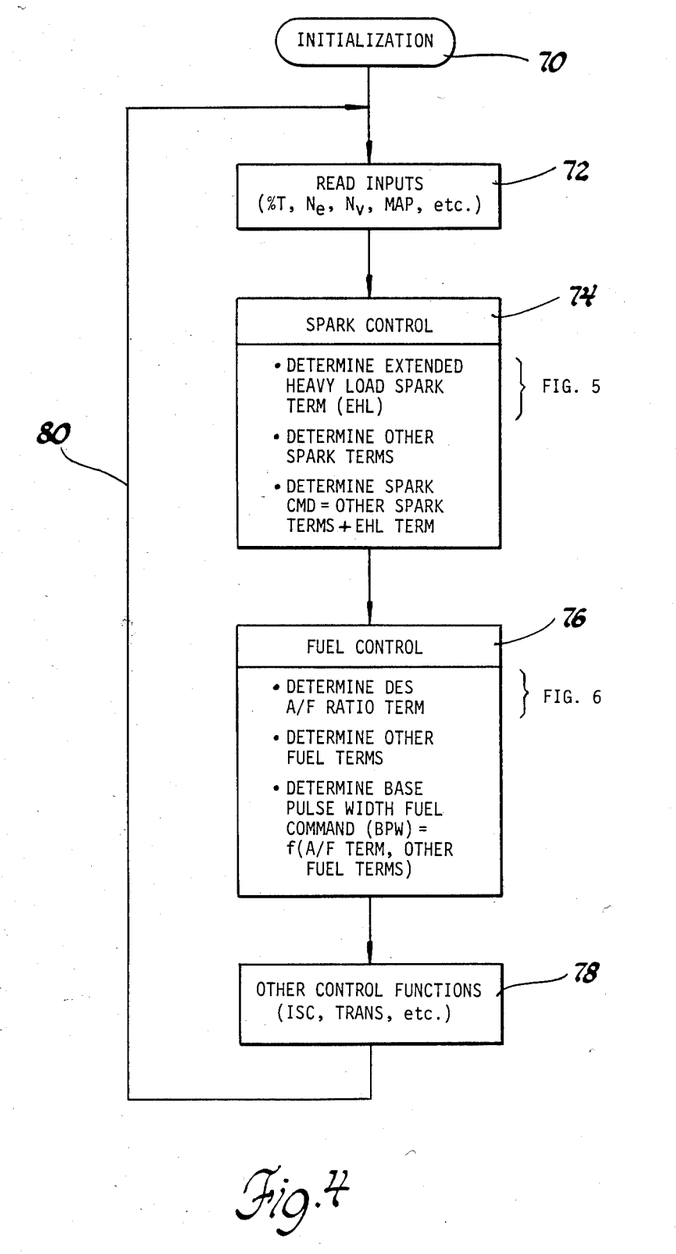
FIGS. 4–6 depict flow diagrams representative of computer program instructions executed by the control unit of FIG. 1 in carrying out the control functions of this invention.
Figure 5:
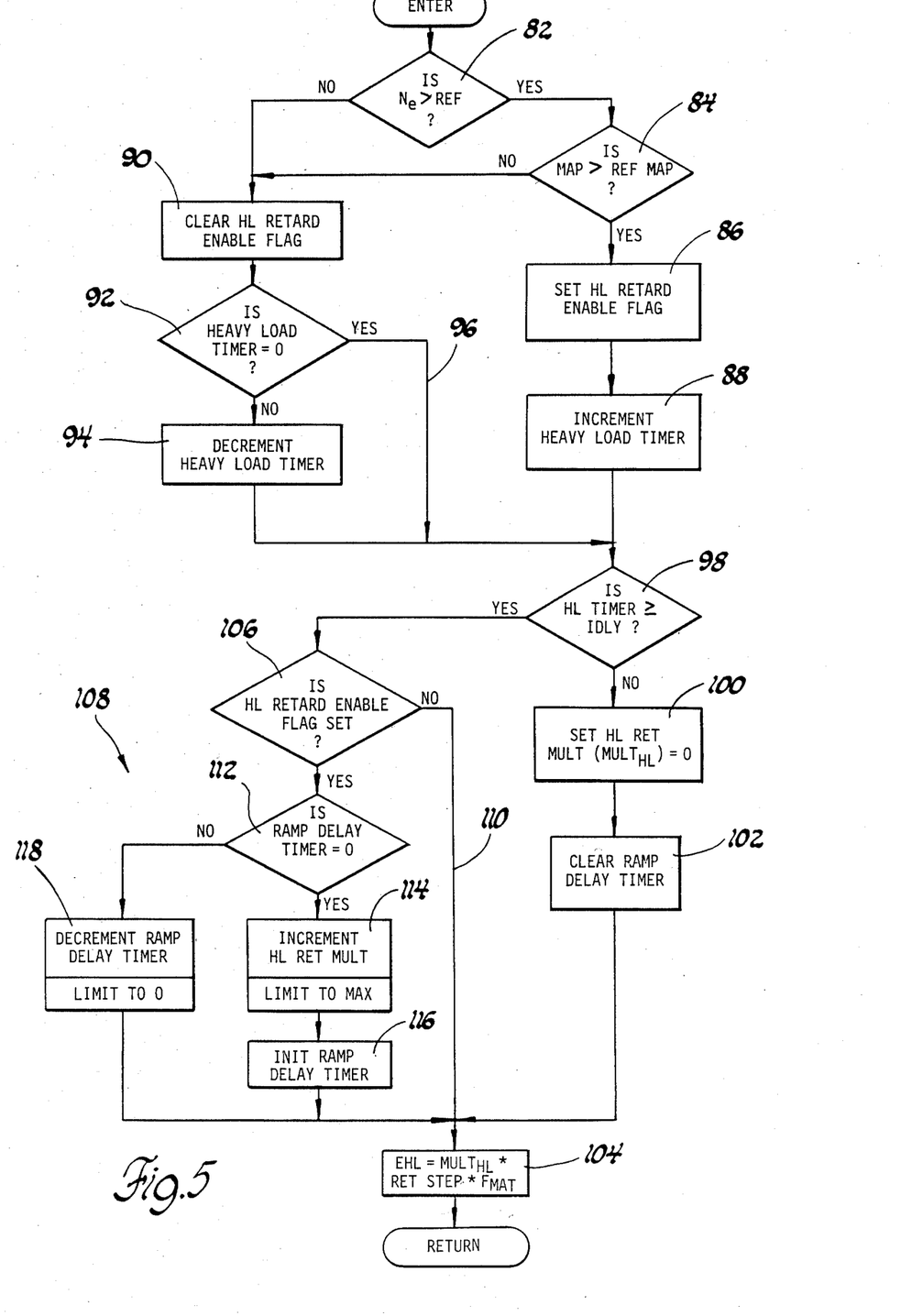
Figure 6:
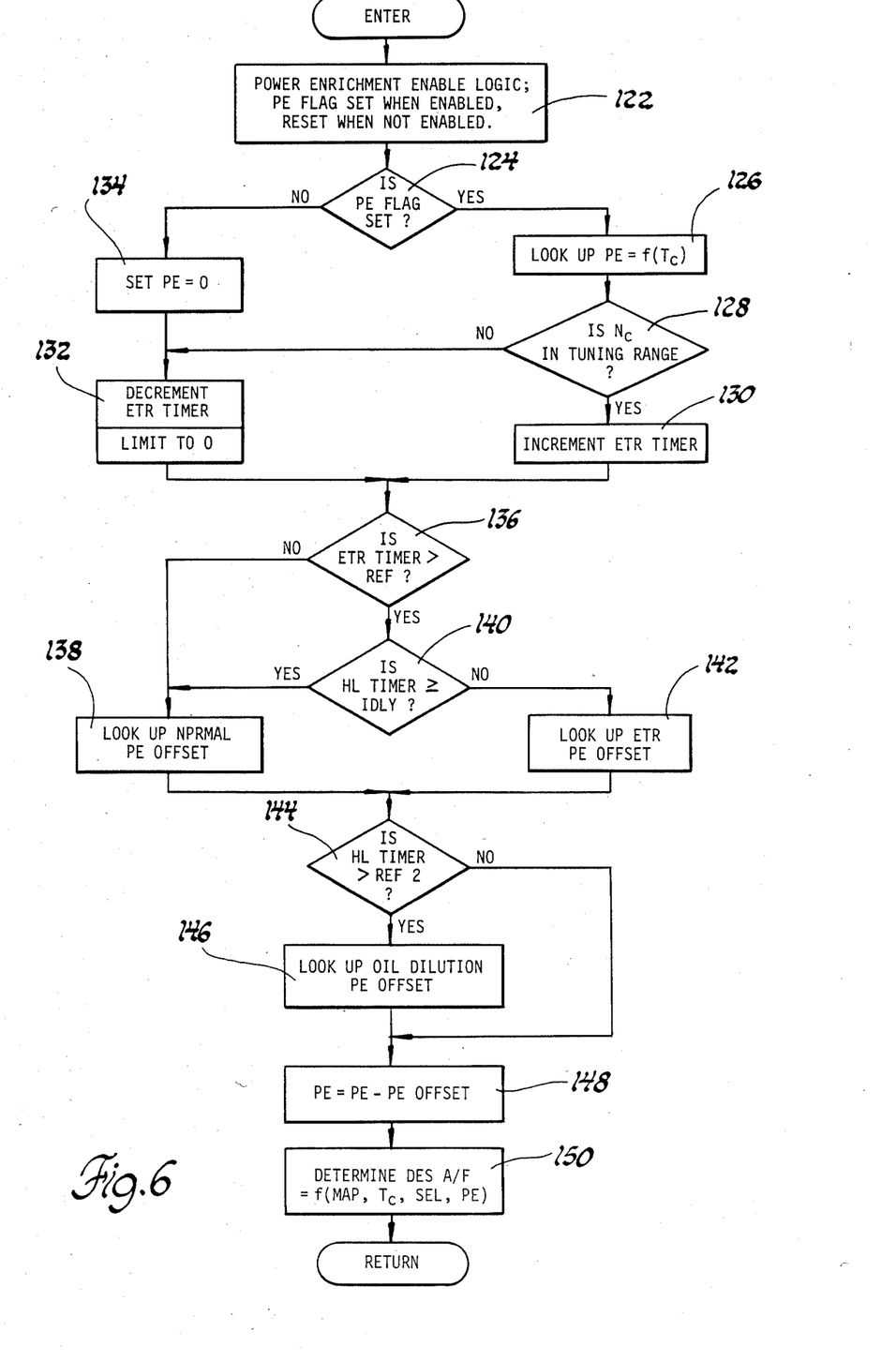

FIGS. 4–6 depict flow diagrams representative of computer program instructions executed by the PCU 40 in carrying out the control functions of this invention described in reference to the graphs of FIGS. 2 and 3.

FIG. 4 designates an executive or main loop program. The block 70 of FIG. 4 represents a series of instructions executed at the initiation of each period of vehicle operation for initializing the various registers, timers, etc., of the PCU 40 prior to the commencement of the control functions of this invention.

The instructions represented by the block 72 cause the PCU 40 to read the various input signals described in reference to FIG. 1, and the instructions represented by the blocks 74–76, direct the execution of the various control functions. The control functions are broadly defined as spark control and fuel control. Other unspecified control functions may also be performed, as indicated by the block 78. The blocks 72–78 are repeatedly executed as indicated by the flow diagram line 80.

As indicated at block 74, the spark control comprises three primary functions. First, a term pertaining to extended heavy load operation (EHL) is determined in accordance with the control of this invention. Second, other engine parameters pertaining to conventional spark timing control are determined, and third, the spark command is determined in accordance with the sum of such other spark-related parameters and the extended heavy load term. The portion pertaining to determining the extended heavy load spark term EHL, is described in further detail in the flow diagram of FIG. 5, as indicated.

As indicated at block 76, the fuel control function comprises the steps of determining the desired air/fuel ratio term, determining other engine parameters pertaining to the engine fueling, and determining a base pulse width fuel command for the fuel control system 32 in accordance with the air/fuel ratio term and the other fuel terms. The step of determining the desired air/fuel ratio term is described in further detail in the flow diagram of FIG. 6, as indicated.

Referring now to the spark control flow diagram of FIG. 5, the decision blocks 82 and 84 determine if the heavy load criteria of engine speed and MAP are met. If both criteria are met, the instruction blocks 86 and 88 are executed to set a heavy load retard enable flag and to increment the count in HL TIMER. As will be seen below, the HEAVY LOAD RETARD ENABLE flag serves when set to indicate that retard of the spark timing from the MBT setting is permitted.

If either of the heavy load criteria are not met, the instruction block 90 is executed to clear the HEAVY LOAD RETARD ENABLE flag. This indicates that retard of the spark timing from the MBT setting is not enabled, or if a retard has already occurred, that no further retard is enabled. Thereafter, the decision block 92 is executed to determine if the count in the HL TIMER is equal to zero. If not, the instruction block 94 is executed to decrement the HL TIMER. If the count is equal to zero, the execution of the instruction block 94 is skipped, as indicated by the flow diagram line 96.

The decision block 98 determines if the count in the HL TIMER is greater than or equal to a reference initial delay period IDLY (referred to in FIGS. 2–3 as REF). If not, the spark timing should be maintained at the MBT setting and instructions blocks 100 and 102 are executed to set a RETARD STEP MULTIPLIER (MULT$_{HL}$) to zero and to clear the RAMP DELAY TIMER. Thereafter, the instruction block 104 is executed to calculate the extended heavy load term EHL referred to in block 74 of FIG. 4 according to the product of MULT$_{HL}$, the retard step (STEP) and a factor F$_{MAT}$ determined as a function of the manifold air temperature (MAT). If the MULT$_{HL}$ has been set to zero, as at instruction block 100, the EHL term is zero.

The factor F$_{MAT}$ permits modification of the commanded spark timing, depending on the temperature of the intake air (MAT). At relatively low temperatures, for example, less retard may be acceptable, and a factor of less than 1.0 is used. If full retard is required, F$_{MAT}$ is set equal to 1.0.

If it is determined at decision block 98 that the count in the HEAVY LOAD TIMER is greater than or equal to the initial delay period IDLY, the decision block 106 is executed to determine if the HEAVY LOAD RETARD ENABLE flag is set. If so, the blocks generally designated by the reference numeral 108 are executed to increment MULT$_{HL}$, if appropriate, to retard the spark timing. If the HEAVY LOAD RETARD ENABLE flag is not set, further retard of the spark timing is not enabled and the execution of the blocks designated generally by the reference numeral 108 is skipped as indicated by the flow diagram line 110. In such case, the spark timing is maintained at its current value, whether at the MBT setting, or retarded from the MBT setting.

Referring to the blocks generally designated by the reference numeral 108, the decision block 112 is first executed to determine if the RAMP DELAY TIMER is equal to zero. As will be seen, the RAMP DELAY TIMER is used to define a delay between the timing retard steps depicted in Graph C of FIG. 3. Thus, if the RAMP DELAY TIMER is equal to zero, the instruction blocks 114–116 are executed to increment MULT$_{HL}$ (limiting it to a maximum value MAX) and to reinitialize the RAMP DELAY TIMER. When the instruction block 104 is subsequently executed, the incrementing of MULT$_{HL}$ serves to increase the value of the EHL term. If the RAMP DELAY TIMER is not equal to zero, the instruction block 118 is executed to decrement the RAMP DELAY TIMER, limiting its value to zero.

The fuel control flow diagram of FIG. 6 determines the desired air/fuel (A/F) ratio, as indicated in block 76 of FIG. 4. As indicated at instruction block 120, the desired air/fuel ratio is determined as a function of several parameters including MAP, the coolant temperature $T_c$, the transmission selector position (SEL), and a power enrichment term (PE). In the illustrated embodiment, the power enrichment term is used to control the air/fuel ratio in the manner depicted in Graph F of FIG. 2. The air/fuel ratio in effect in the interval $t_0$-$t_1$ of FIG. 2 are defined by a first (normal) power enrichment offset; the air/fuel ratio in effect in the interval $t_1$-$t_2$ is defined by a second (extended tuning range) power enrichment offset; and the air/fuel ratio in effect after time $t_{10}$ is defined by a third (oil dilution) power enrichment offset.

Initially, the PCU 40 executes the power enrichment enable logic, as indicated by the block 122. If it is determined that power enrichment should be enabled, the PE flag is set; if it is determined that power enrichment should not be enabled, the PE flag is reset. The primary criteria for enabling power enrichment is the position of the engine throttle 20. Once the block 122 is executed, the decision block 124 is executed to determine if the PE flag is set. If so, the instruction block 126 is executed to look up a power enrichment term PE as a function of the coolant temperature $T_c$, and the decision block 128 is executed to determine if the engine speed $N_e$ is in the tuning range, as defined in Graph C of FIG. 2. If so, the instruction block 130 is executed to increment the extended tuning range timer (ETR TIMER). If the engine speed $N_e$ is not in the tuning range, the instruction block 132 is executed to decrement the ETR TIMER, limiting its value to zero. If the PE flag is not set, the instructions blocks 134 and 132 are executed to set the power enrichment term PE to zero and to decrement the ETR TIMER.

The decision block 136 determines if the count in the ETR TIMER is greater than a reference count REF. If not, the instruction block 138 is executed to determine a first (normal) power enrichment offset term PE OFFSET as a function of the engine speed $N_e$. As indicated above, this corresponds (in the example illustrated in FIG. 2) to the air/fuel ratio in effect in the interval $t_0$–$t_1$ in Graph F of FIG. 2. If the ETR TIMER is greater than the reference time REF, the decision block 140 is executed to determine if the count in HL TIMER is greater than or equal to the reference term IDLY. If so, the timing is being or has been retarded from the MBT setting, and the instruction block 138 is executed to look-up a first (normal) PE OFFSET. If HL TIMER is less than IDLY, the timing is at the MBT setting, and instruction block 142 is executed to look up a second (extended tuning range) PE OFFSET as a function of the engine speed $N_e$. This offset refers, as indicated above, to the desired air/fuel ratio in effect in the interval $t_1$–$t_2$ in Graph F of FIG. 2. Then the decision block 144 is executed to determine if the count in HL TIMER is greater than a relatively high reference REF 2, as depicted in Graph D of FIG. 2.

If so, there has been extended heavy load operation with power enrichment and the instruction block 146 is executed to look up a third (oil dilution) PE OFFSET for increasing the desired air/fuel ratio to prevent dilution of the engine oil with fuel. This offset corresponds, as indicated above, to the air/fuel ratio in effect after time $t_{10}$ in Graph F of FIG. 2. If the HL TIMER is less than or equal to the reference REF 2, the execution of instruction block 146 is skipped, as indicated by the flow diagram line 148.

Thereafter, the instruction block 150 is executed to compute the power enrichment term PE as a function of the PE term determined at instruction blocks 126 or 134, and the PE OFFSET determined at instruction blocks 138, 142 or 146. The instruction block 120 is then executed, as indicated above, to determine the desired air/fuel ratio as a function of MAP, coolant temperature $T_c$; transmission selector position SEL, and the power enrichment term PE determined at instruction block 150.

In the manner described above, the spark and fuel control of this invention cooperate to provide substantially optimum engine performance so long as engine performance concerns predominate. When the count in the HL TIMER indicates that engine protection concerns predominate, the spark and fuel controls cooperate to reduce the engine power output to protect the engine from damage due to excessive detonation and/or preignition. As soon as the count in the HL TIMER falls below IDLY, engine performance concerns predominate again, and the spark and fuel controls cooperate to provide optimum engine performance. In this way, the controls provide optimum overall engine performance without risking engine damage in extended heavy load driving conditions.

While this invention has been described in reference to the illustrated embodiment, it will be understood that various modifications will occur to those skilled in the art and that controls incorporating such modifications may fall within the scope of this invention which is defined by the appended claims.

The embodiments of the invention in which an exclusive property or priviledge is claimed are defined as follows:

1. A control system for a spark ignition internal combustion engine including spark timing means for initiating engine combustion events in accordance with a spark timing signal, and fuel delivery control means for delivering fuel to the engine, the engine having a tuning range of speeds during which there is increased tendency for engine knock and/or preignition to occur, the control system comprising:

optimum performance control means effective during engine operation for which engine performance concerns predominate for (1) supplying the spark timing means with a spark timing signal corresponding to an empirically determined MBT setting for substantially maximum engine torque and (2) causing the fuel delivery control means to deliver an extra amount of fuel to the engine if the engine speed is in said tuning range, permitting continued safe operation with the spark timing means controlled to said MBT setting;

reduced performance control means activateable during engine operation for which engine protection concerns predominate for overriding said optimum performance control means by supplying the spark timing means with a spark timing signal which progressively retards the spark timing from the MBT setting to a predetermined value at which engine operation may be continued at a reduced performance level without incurring engine damage;

timing means for identifying periods of heavy engine loading above a threshold engine speed and load, and for integrating such periods over time to define cumulative heavy loading indication; and engine protection means effective when the cumulative heavy loading indication exceeds a reference time for activating the reduced performance control means to protect the engine from damage.

2. The control system set forth in claim 1, where:
the reduced performance control means includes means effective if the engine speed is in the tuning range when the engine protection means activates the reduced performance control means for causing the fuel delivery control means to cut off the extra amount of fuel commanded by the optimum performance control means.

3. The control system set forth in claim 1, where:
the reduced performance control includes means effective when the cumulative heavy loading indication time exceeds a threshold greater than said reference time for causing the fuel delivery control means to further decrease the scheduled fuel amount, thereby to prevent dilution of the engine oil.

4. A control system for a spark ignition internal combustion engine including spark timing means for initiating engine combustion events in accordance with a spark timing signal, and fuel control means for delivering fuel to the engine in accordance with a fuel control signal, the engine having a tuning range of speeds during which there is increased tendency for engine knock and/or preignition to occur, the system comprising:

optimum performance control means effective during engine operation for which engine performance concerns predominate for supplying the spark timing means with a spark timing signal corresponding to an empirically determined MBT setting for substantially maximum engine torque, and supplying the fuel control means with a fuel control signal which provides for the delivery of extra fuel whenever the engine speed is in the tuning range, thereby to enable safe operation at the MBT setting;

heavy loading detection means including identifying means for identifying periods of heavy engine loading above specified engine speed and load thresholds, counter means for storing a heavy loading count, and integrator means for increasing the count stored in the counter means during the identified periods of heavy engine loading, and otherwise decreasing the count stored in the counter means; and engine protection means effective when the count stored in said counter means exceeds a reference count for overriding said optimum performance control means and supplying the spark timing means with a spark timing signal which progressively retards the spark timing from the MBT setting to a predetermined value at which engine operation may be continued at a reduced performance level without incurring engine damage.

5. The control system set forth in claim 4, where:

the engine protection means includes means effective if the engine speed is in the tuning range when the count stored in the counter means exceeds the reference count for cutting off the extra fuel provided by the optimum performance control means.

6. The control set forth in claim 4, including:

secondary fuel control means effective when the count in said counter means exceeds a threshold count greater than said reference count for effecting a decrease in the delivered fuel, thereby to prevent dilution of the engine oil.

* * * * *